United States Patent [19]

Reedyk

[11] 3,778,561
[45] Dec. 11, 1973

[54] ELECTRET MICROPHONE

[75] Inventor: Cornelis Wilfred Reedyk, Ottawa, Ontario, Canada

[73] Assignee: Bell Canada-Northern Electric Research Limited, Ottawa, Ontario, Canada

[22] Filed: June 21, 1972

[21] Appl. No.: 264,889

[52] U.S. Cl............................................ 179/111 E
[51] Int. Cl........................................... H04r 19/00
[58] Field of Search ................. 179/111 R, 111 E, 179/106, 1 R

[56] References Cited
UNITED STATES PATENTS
3,118,022  1/1964  Sessler et al. ................... 179/111 E FOREIGN PATENTS OR APPLICATIONS
348,573  5/1931  Great Britain ................... 179/111 E
601,117  7/1934  Germany........................... 179/111 R
838,022  6/1960  Great Britain ................... 179/111 R Primary Examiner—Kathleen H. Claffy
Assistant Examiner—Thomas L. Kundert
Attorney—Frank Turpin

[57] ABSTRACT

An electroacoustic transducer uses an electret which does not require metallization of a surface thereof. The electret is sandwiched between a pair of stationary, air-permeable electrodes disposed substantially coplanar and the output of the transducer is obtained from across the pair of electrodes.

4 Claims, 4 Drawing Figures

ELECTRET MICROPHONE

This invention relates to electroacoustic transducers generally and more particularly to a novel electrostatic transducer.

In the last few years, there has been a proliferation of condenser microphones using electrets as the diaphragm. As is now well known in the art, an electret is a dielectric material that has been subjected to a sufficiently intense electrostatic field to produce a residual polarization that remains after the field is removed. Therefore, the electret has proven almost ideal for the construction of self-biasing capacitive transducers.

However, most transducers that have been devised using an electret usually suffer from a number of problems, some of which are common to capacitive transducers not using an electret. For example, a surface of the electret must be metallized since it functions as an electrode for the device. Metallization has proven to be a difficult and expensive process. The adhesion of metal to a dielectric material such as the material sold under the trademark "Teflon" (which is presently being used extensively in the industry) has been found to be poor and to be subject to deterioration in humid atmospheres. Also, the external connection to the metallized surface of the electret has proved to be difficult. Prior art capacitive transducers also exhibit substantial harmonic distortion in their output signal.

The electrostatic electret transducer of the present invention overcomes the above disadvantages and exhibits further advantages. For example, the electret of this transducer does not require to have a surface thereof metallized. There is therefore, no need to provide an electrical connection to a fragile metal layer on the electret.

In accordance with the invention, there is provided a transducer comprising a pair of stationary, air-permeable electrodes disposed substantially coplanar and having an electret sandwiched between them. The electrodes are provided with means for connecting them to an external circuit.

In view of its particular construction, the invention may properly be called a moving charge transducer rather than a capacitive transducer from which it differs in some important aspects.

In the conventional capacitive transducer, the electromechanical interaction is derived from a mechanical variation of the capacitance which results in a variable current through the varying capacitor. This is a nonlinear process so that harmonics of the driving frequency are produced. The moving charge transducer however, is distortion free. The electromechanical coupling is inherently linear because it is due to a one-to-one relationship between the mechanical motion of a charge between the electrodes of a capacitor and the electrical current flowing through the capacitor.

The electrodes of the moving charge transducer are stationary and therefore do not have to be as light as the electrodes in conventional capacitor microphones. Also, identical piece parts may be used for the two electrodes and the transducer can easily be balanced against external electrical interference because of its symmetrical structure.

Illustrative embodiments of the invention wil now be described in conjunction with the drawings wherein.

As mentioned above, the electromechanical coupling in a moving charge transducer is inherently linear because it is due to a one-to-one relationship between the mechanical motion of a charge between the electrodes of a capacitor and the electrical current flowing through the capacitor. The output signal from such a transducer is therefore free from harmonic distortion. The operation of moving charge transducers may be explained briefly in conjunction with FIG. 1 of the drawings.

There is shown an electret 1 disposed between a pair of stationary, air-permeable electrodes 2 and 3. An impedance element 4 is connected in shunt with electrodes 2 and 3. The electrical charge of the electret 1 may be represented by a plane 5 representing the centre of effort of the volume charge density of the electret 1. With the electret at rest, an electrostatic field exists between the electret 1 and the electrodes 2 and 3. These are represented by $Fe2$ and $Fe3$ respectively. Under these conditions, stationary equilibrium is established such that charge densities are induced in the electrodes 2 and 3 and the potential difference between them is zero. When the electret 1 is set in motion under the influence of an applied acoustic pressure which may be represented by the mechanical force $Fa$, the moving charge layer represented by plane 5 of the electret will cause the charge densities of electrodes 2 and 3 to vary and current to flow in the external circuit through the load resistor R to restore the equilibrium condition. Maintaining the equilibrium zero potential difference condition between electrodes 2 and 3 will only be possible if the time constant of the electrical circuit is zero, i.e., $R = 0$, or at least small compared with the lowest frequencies in the signal. When the resistance is small, the current must be amplified with a current amplifier, and when the resistance is large, the voltage drop across it must be amplified with a voltage amplifier.

Figure 1:
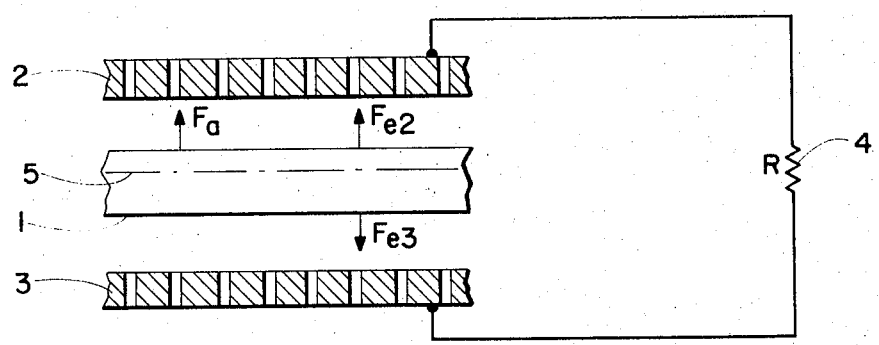
FIG. 1 is a representative schematic diagram which may be used to explain the operation of a moving charge transducer.

As may be realized from the above discussion, a moving charge microphone such as shown in FIG. 1 is reciprocal. An electrical signal applied to the electrodes will set the electret in motion thereby generating an acoustic pressure.

Figure 2:
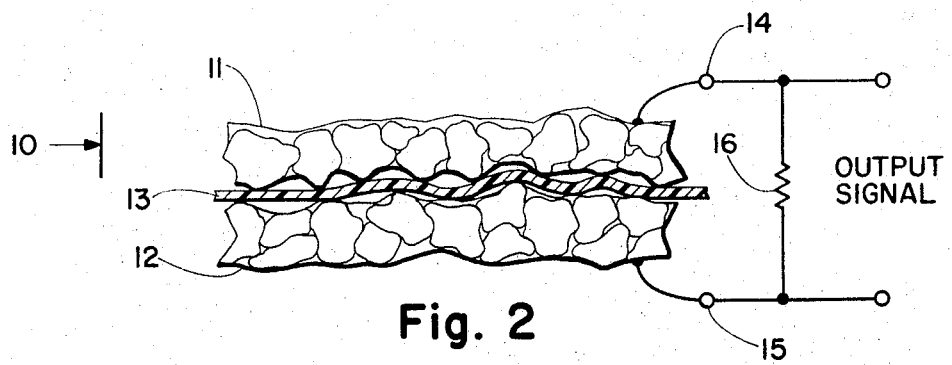
FIG. 2 is a cross-sectional view of an embodiment of a moving charge transducer in accordance with the invention.

FIG. 2 shows a transducer 10 comprising a pair of electrodes 11 and 12 and an electret 13 which may be made of the material sold commercially under the trademark "Teflon." The electrodes 11 and 12 are conductive and air-permeable so that the acoustic energy is allowed to impinge on the electret 13. The electrodes 11 and 12 may conveniently be a pair of sintered bronze disks held stationary by any well known means. The electrodes 11 and 12 are electrically connected to a pair of terminals 14 and 15 respectively which may be connected to an external impedance 16 and amplifier means (not shown). Because of the rough texture of the sintered bronze, there are many areas where the electret 13 is free to move between the electrodes 11 and 12, thus forming a plurality of transducers acting in parallel.

Figure 3:
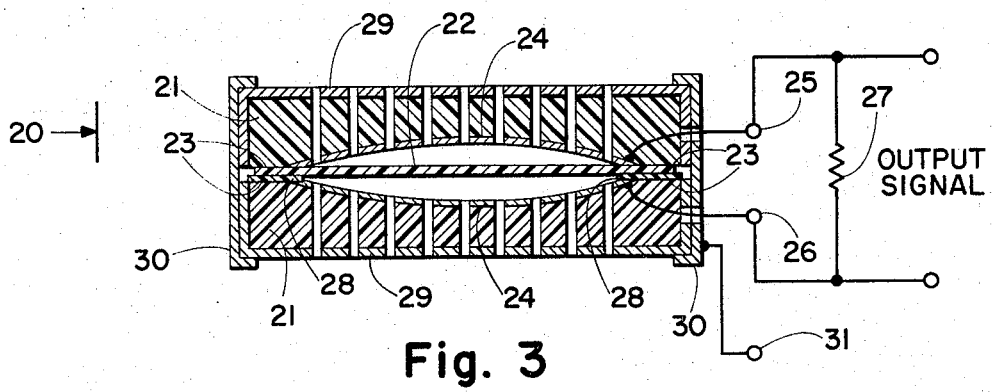
FIG. 3 is a cross-sectional view of the preferred embodiment of a moving charge microphone in accordance with the invention.

FIG. 3 illustrates a preferred embodiment of a microphone in accordance with the invention. There is shown a microphone 20 comprising a pair of plates 21 disposed substantially coplanar and an electret 22 sandwiched therebetween. A major portion of the mating surface of each plate 21 is shaped concavely to conform with the shape of the electret diaphragm when it is displaced from its neutral position. The mating surfaces of the plates 21 each have a pair of shoulders 23 between which the edges of the electret 23 are held.

The plates 21 of the microphone 20 may be made entirely of metal in which case the entire plates 21 function as electrodes. Alternatively, the plate 21 may be of an insulating material as shown in FIG. 2. Plates 21 are of an insulating plastic perforated to make them permeable to air. The concave surfaces of the plates 21 are coated with a conductive material to form electrodes 24. The coating of the concave surfaces may be obtained by any well known method such as metallization or by the lamination of a thin metallic foil with the plastic plates. The electrodes 24 are electrically connected to terminals 25 and 26 which may be connected to an external circuit such as resistance element 27 and amplifier means (not shown).

In practice, it has been found that the plane representing the centre of effort of the volume charge density of an electret is not equidistant from the major surfaces thereof but rather tends to be nearer one of the surfaces. Therefore, in order that the plane representing the center of effort of the volume charge density of the electret 23 be approximately equidistant from the electrodes 24, spacers 28 may be placed between a surface of the electret 22 and the adjacent plate 21.

A microphone embodying this type of structure may be quite small in size. For example, a useful device may be built using an electret having a thickness of 0.5 thousandths of an inch and having a free length (length between support shoulders) and width of 0.1 inch. For such an electret, the conform concave shape of the electrodes may be approximated with a constant radius which may be of the order of 5 inches. In view of the minute size of such a structure, it is possible to connect a plurality of them in parallel and still obtain a microphone of small dimensions. Such a structure may readily be obtained by using a single pair of electrodes or plates having their mating surfaces shaped in a plurality of concave depressions and a single electret sandwiched therebetween. Such a structure would then be similar to the microphone shown in FIG. 2.

The outer surfaces of each of the plates 21 may be coated with a layer 29 of conductive material. The layers 29 of the plates 21 may then be electrically connected together to form a shield against electrical interference by metal clips 30 which also serve to hold together the plates 21, the electret 22 and the spacers 28 in the required disposition. Alternatively, the entire assembly may be held by any other means such as bolts urging the shoulder portions 23 of plates 21 together. The electrical shield may then be electrically connected to a terminal 31 for connection to an external circuit.

Figure 4:
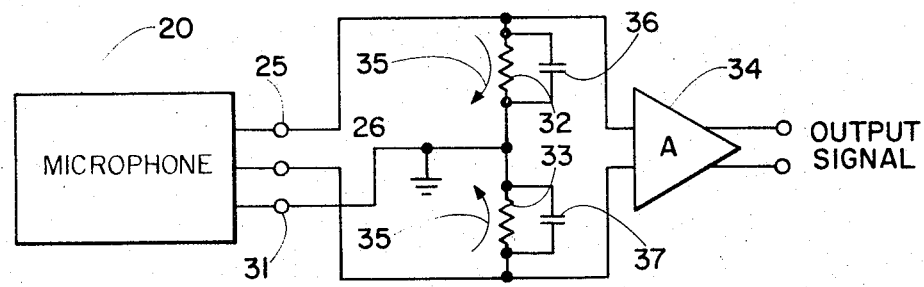
FIG. 4 is a schematic diagram showing the microphone of FIG. 3 connected to a balanced external circuit.

In circumstances where a high level of electrical interference is experienced and electrical shielding is inadequate because of the necessary perforation of the shield, the effects of the induced electrical signals on the electrodes may be minimized by using a balanced circuit and a differential amplifier. FIG. 4 of the drawings shows the microphone 20 of FIG. 3 connected in such a manner. A pair of serially connected resistance elements 32 and 33, substantially equal in value, are connected in shunt with electrodes 24 of the microphone 20 and to a pair of input terminals of a differential amplifier 34. The junction of elements 32 and 33 is connected to ground and to the shield terminal 31 of microphone 20. An output signal may be obtained from the output terminals of amplifier 34. As indicated by arrows 35 in the drawing, the stray currents induced in electrodes 24 are in opposition and tend to cancel each other out. Also, in order to compensate for any unbalance in the capacitance to ground of the electrodes 24, capacitive elements 36 and 37 may be connected in shunt with resistance elements 32 and 33 respectively.

The transducers shown in FIGS. 2 and 3 are essentially bidirectional microphones. The basic transducer shown in FIG. 3 may be used as a pressure sensitive microphone by the addition of further acoustic components. For example, this may be achieved by exposing only one side of the microphone to the sound field, while the other side is coupled via the perforated electrode to a closed cavity. If an opening is made in the cavity and the acoustic resistance of this opening is given a predetermined value, a unidirectional microphone results.

A moving charge transducer as described above may be adapted to a multitude of uses. For example, it may be used as a microphone, earphone, key transducer and loudspeaker in telephone apparatus. For various applications, the dimensions and acoustical components of the transducer must be chosen according to the intended use. In key transducer applications, for example, where an array of switches is required, it is possible to design the array as a single unit wherein the individual transducers are mechanically and electrically separate, i.e., having separate actuating mechanisms and actions but a single electret and one pair of plates supporting the electrodes.

What is claimed is:

1. A moving-charge transducer comprising, a pair of stationary air-permeable plates of insulating material disposed substantially coplanar, an electret, means for securing the plates together to form a sandwich with said electret, the mating surfaces of said plates being coated with a first layer of conductive material to form electrodes, means for connecting said electrodes to an external circuit, a second layer of conductive material covering the outer surfaces of each of the plates, means for connecting said second layers together and to an external circuit.

2. A transducer as defined in claim 1 further comprising, a pair of serially connected resistance elements substantially equal in value and connected in shunt with said electrodes, the junction of said resistors being connected to said second layers and to ground.

3. A transducer as defined in claim 2 further comprising, a pair of capacitive elements, each element being connected in shunt with a respective one of said resistance elements.

4. A transducer as defined in claim 3 further comprising a differential amplifier having a pair of input terminals, each input terminal being respectively connected to said electrodes.

* * * * *